Sept. 12, 1961 P. HARTER ET AL 2,999,435
AUTOMATIC EXPOSURE CONTROL FOR PHOTOGRAPHIC CAMERAS
Filed Jan. 4, 1960

PAUL HARTER
ERWIN STAUDT
INVENTORS

BY R. Frank Smith

Robert W. Hampton
ATTORNEYS

United States Patent Office 2,999,435
Patented Sept. 12, 1961

2,999,435
AUTOMATIC EXPOSURE CONTROL FOR PHOTOGRAPHIC CAMERAS
Paul Harter, Stuttgart-Wangen, and Erwin Staudt, Stuttgart, Germany, assignors to Eastman Kodak Company, Rochester, N.Y.
Filed Jan. 4, 1960, Ser. No. 178
Claims priority, application Germany Feb. 14, 1959
8 Claims. (Cl. 95—10)

The present invention relates generally to a photographic or cinematographic camera with exposure control, in which one of the exposure factors, diaphragm opening or shutter speed, is set by scanning the position of a pointer of a photoelectric exposure meter, and in which the other of these exposure factors (shutter speed or diaphragm opening) as well as possible additional factors, such as film speed, filter factors or the like, is set by moving the entire measuring instrument of the exposure meter. More particularly, the invention relates to means for preventing operation of such cameras when scene brightness is outside a predetermined range, and to signal the camera operator in such case.

It is a common practice with a camera having an automatic exposure control system, to automatically prevent operation of such camera in case of inadequate light. However, if the entire instrument of the exposure meter in such camera is movable to compensate for changes in one or more exposure factors, the starting or zero position of the instrument pointer of the exposure meter may be spatially related to the scanning mechanism such that the camera may be operated even though the prevailing light conditions do not suffice for a proper exposure.

It is therefore a primary object of the present invention to overcome the foregoing defect in a particularly simple way. According to the invention, this is accomplished by providing stopping means which render the operation of the camera impossible when the instrument pointer assumes its zero position, regardless of the position of the overall meter instrument.

According to another feature of the invention, the stopping means is adjustable together with the meter instrument as well as relative to the same. With the measuring instrument as a whole adjusted in one direction, camera operation is prevented if the instrument pointer assumes its zero position relative to the instrument, irrespective of the position of the instrument itself. On the other hand, with the instrument adjusted in the opposite direction, the stopping means are retained in a position which permits camera operation only when the instrument pointer is within the range that is covered by the exposure-factor setting members.

Other objects and features of the invention will be apparent from the following description, reference being made to the accompanying drawings, wherein.

Figure 1:
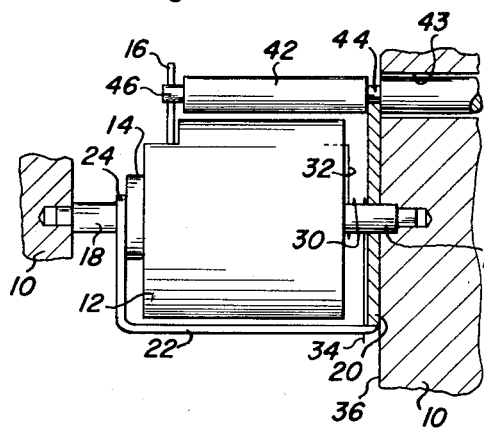
FIG. 1 shows a side view of the meter instrument and its controls, partly in section.
Figure 2:
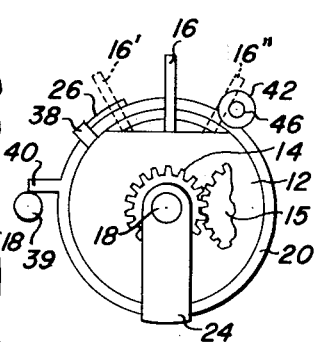
FIG. 2 shows a front view of the device according to FIG. 1.
Figure 3:
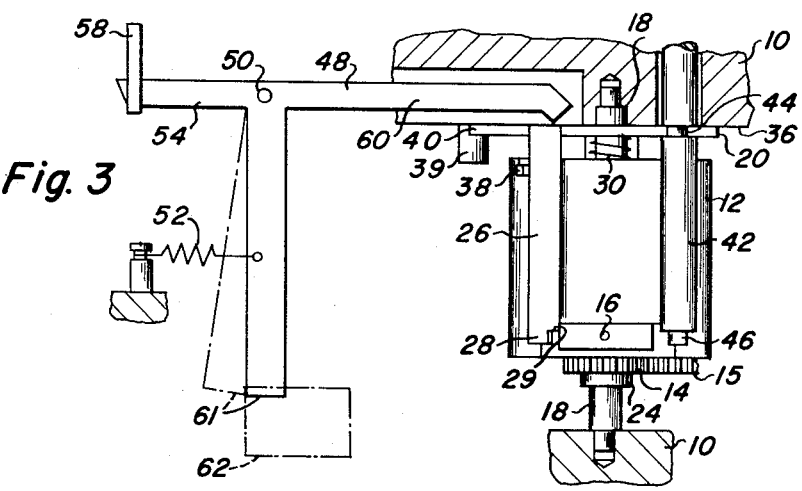
FIG. 3 is a top view of the device according to FIG. 1, partly in section, also showing a portion of the camera operating mechanism.

Referring to FIGS. 1, 2 and 3, in the housing 10 of a camera, a measuring instrument 12 of a photoelectric exposure meter is rotatably arranged in any well known way, for example as disclosed in British Patent No. 690,079. A gear wheel 14 is rigidly connected to the measuring instrument 12 and engages a gear 15, which is coupled to a setting member for the shutter speed, for example in the manner disclosed in the above British patent. The instrument pointer of the exposure meter is designated at 16. On the axis 18 of the measuring instrument 12 is mounted a sensing member for pointer 16. The sensing member includes a disk 20 which is arranged in such a way that it is rotatable relative to the measuring instrument 12 and displaceable along the axis 18 relative to the measuring instrument. An L-shaped frame 22 has one end secured to disk 20. Frame 22 embraces the measuring instrument 12 and has its other end 24 rotatably mounted on the axis 18 of the measuring instrument. An arm 26 is secured at one end to disk 20 and extends parallel to the measuring instrument 12. The free end 28 of arm 26 projects into the path of movement of the instrument pointer 16 for sensing the position of the latter.

On the axis 18 between the measuring instrument 12 and the disk 20 there is a spring 30 one of whose ends 32 is secured to the measuring instrument 12 and the other of whose ends 34 abuts against the frame 22 of the disk 20. Spring 30 forms both a compression spring and a torsion spring, so that on the one hand it urges disk 20 away from the measuring instrument 12 and toward a wall 36 of the camera housing 10, and on the other hand tends to rotate the disk 20 counterclockwise (as viewed in FIG. 2), i.e., arm 26 always abuts against a pin 38 projecting from the measuring instrument 12. An ear 40 of disk 20, as disclosed in the following description of the mode of operation of the device, is provided for cooperation with an arresting pin 39 fixed to the camera housing.

A bolt 42 is axially displaceable in a cylindrical hole 43 in the camera housing 10. Bolt 42 is provided with an annular slot 44, which is engaged by disk 20. Therefore, disk 20 determines the axial position of bolt 42. A recessed end 46 of the bolt 42 projects into the path of movement of the instrument pointer 16 for cooperation therewith as described hereinafter.

A three-armed lever 48 (FIG. 3) is rotatably arranged around a pivot 50 secured to the camera housing. Lever 48 is urged clockwise (as viewed in FIG. 3) by a spring 52, so that an arm 54 of lever 48 is always pressed against an edge 56 (FIG. 4) of the camera operating lever 58. An arm 60 (FIG. 3) of lever 48 projects into the path of the disk 20 along axis 18 and cooperates with that disk. An arm 61 of lever 48 is designed to form a signal visible in the viewer 62 or to control such a signal.

The device functions as follows:

Prior to the taking of a photographic exposure, the desired shutter speed is set in a way that is well known in the art, and through gears 15 and 14 measuring instrument 12 is rotated to a position corresponding to the setting of the shutter speed. Film speed as well as filter factors or the like also may be compensated through a differential mechanism associated with gear 14, in the manner disclosed in the aforementioned British Patent No. 690,079. Thus, the angular position of the measuring instrument 12 corresponds to the selected shutter speed and/or other factors.

The angular position of the instrument pointer 16 relative to instrument 12 is determined by the intensity of the light influencing the photoelectric cell (not shown) of the meter. When the camera operating lever 58 is actuated, i.e., moved in the direction of the arrow in FIG. 4, the instrument pointer 16 is trapped and retained in its assumed position by means not within the scope of the present invention but shown for example, in U.S. Patent No. 2,124,886. Pointer 16 may then serve as a differentially positioned stop for a scanning member connected to the setting member for the diaphragm, as disclosed in the above U.S. patent. Since, as described hereinbefore, the entire measuring insturment 12 was rotated to a certain angular position corresponding to the selected shutter speed and/or other factors, the correct combination of shutter speed, diaphragm opening and other factors, i.e., the combination that will result in good exposures under the prevailing light conditions, is set after the scanning member connected to the setting member for the diaphragm is stopped by the instrument pointer 16.

Figure 4:
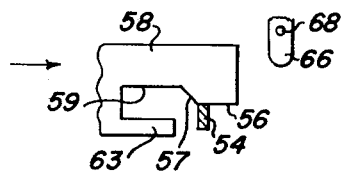
FIG. 4 is a view of a section of FIG. 3.

Assuming that the instrument pointer 16 has assumed the position shown in solid lines in FIG. 2, displacement of the operating lever 58 in the direction of the arrow in FIG. 4 permits arm 54 of lever 48 to slide, under the influence of spring 52, along a sloping edge 57 of the operating lever, i.e., lever 48 is rotated clockwise (FIG. 3) around its pivot 50. This permits the operating lever to engage a shutter-release member 66, pivoted at 68, and to rotate that member for actuating the camera shutter in the manner well known in the art. Spring 52 is stronger than spring 30; therefore, disk 20 is displaced by lever arm 60 along the axis 18 of the measuring instrument, against the tension of spring 30, in response to movement of lever 48. The bolt 42 moves with disk 20, due to the engagement between disk 20 and the annular slot 44. Simultaneously, arm 61 of lever 48 rotates out of the field of view of viewer 62, which indicates for the camera operator that a normal release of the shutter occurred.

When the intensity of the light influencing the photoelectric cell is so small that the instrument pointer 16 does not show any deflection, i.e., pointer 16 remains in its zero position relative to the instrument body, the pointer engages a steplike recess 29 of the disk arm 26. This position of the pointer is indicated in FIG. 2 at 16'. When the operator tries to release the shutter with the pointer in this position, the operating lever 58 is moved in the direction of the arrow in FIG. 4; spring 52 tries to rotate lever 48 clockwise. However, disk 20 is prevented from any displacement along axis 18 by the engagement of the instrument pointer 16 with recess 29 of arm 26; therefore, lever 48, whose arm 60 engages disk 20, is prevented from rotating about pivot 50. Arm 54 of lever 48 thus cannot slide along the sloping edge 57 of the operating lever 58 into the recess 59, as it could in the case described above, but is retained in its downward position. After a slight movement of the operating lever 58 in the direction of the arrow in FIG. 4, an arm 63 on the operating lever engages lever arm 54, whereby further movement of the operating lever 58 is blocked, so that the camera shutter is not actuated by member 66. Arm 61 of lever 48 remains visible in the window of the viewer 62, which indicates to the camera operator that the subject lighting is not proper for an exposure. It will be obvious that arm 61 may normally lie outside the field of view of the finder and be moved into that field only when an exposure can be made.

FIGS. 2 and 3 show that the arm 26 of the disk 20 cooperates with pin 38, which projects from the body of instrument 12, such that arm 26 is always urged into contact with pin 38 by the torsional force of the spring 30. When arm 26 is in this position relative to the instrument, the steplike recess 29 is at the zero position of the instrument pointer 16. When the measuring instrument 12 is rotated clockwise from its FIG. 2 position, to adjust for shutter speed, arm 26 and disk 20 are moved clockwise by pin 38. Therefore, regardless of the angular position of the instrument body, the pointer 16 engages the steplike recess 29 of arm 26 when it assumes its zero position relative to the instrument body.

When the instrument body is rotated counterclockwise from the position shown in FIG. 2, arm 40 of disk 20 engages the fixed stopping pin 39, whereby disk 20 and arm 26 are retained in limiting angular positions against the torsional effect of spring 30. These limiting positions of disk 20 and arm 26 are selected such that the instrument pointer 16 engages the steplike recess 29 of arm 26 when the pointer moves counterclockwise beyond the position corresponding to the largest exposure value in the exposure range of the camera, (in the present case the largest possible diaphragm opening), regardless of the position of the pointer relative to the body of instrument 12.

Since each position of pointer 16 relative to the instrument body corresponds to a certain diaphragm setting, it is possible that for obtaining satisfactory exposures a certain shutter speed setting requires a diaphragm opening that is smaller than the smallest diaphragm opening available on the camera. In order to prevent camera operation in this case, too, the recessed end 46 of bolt 42 is engaged by and stops the instrument pointer 16 when the pointer moves clockwise (FIG. 2) to the position corresponding to the smallest settable diaphragm opening. If the operator tries under these circumstances to operate the camera, axial movement of bolt 42 is prevented by the instrument pointer 16 abutting against the recessed end 46. Due to the engagement of the disk 20 with the annular groove 44 of bolt 42, disk 20 also is prevented from moving toward instrument 12; therefore, rotation of lever 48 around its pivot 50 is prevented. In this case, too, arm 63 of the operating lever 58 engages lever arm 54, so that no shutter release can occur. Arm 61 of lever 48 remains visible in the window of the viewer 62, thereby indicating that the camera is not ready for an exposure. The position of the instrument pointer in this case is indicated in FIG. 2 at 16''. It is understood, of course, that the instrument pointer 16 may be scanned for setting the shutter speeds instead of or in addition to the diaphragm opening. In this case, measuring instrument 12 is angularly positioned as a function of the setting of the diaphragm and/or the other exposure factors such as film speed and filters.

The invention has been described in detail with particular reference to a preferred embodiment thereof, but it will be understood that variations and modifications can be effected within the spirit and scope of the invention as described hereinabove and as defined in the appended claims.

We claim:

1. In a camera including a frame; first and second adjustable exposure control elements; an exposure meter with a photocell disposed for illumination by scene light and an electric measuring instrument connected to said photocell, said instrument having a body coupled to said first element and movable relative to said frame for adjustment in conjunction with said first element, said instrument also having a pointer deflected differentially as a function of scene brightness in a predetermined path from a zero position relative to said instrument body; a camera operating member disposed for manual actuation; and means coupled to said operating member and cooperating with said second element and said pointer for adjusting said second element as a function of the position of said pointer relative to said camera frame; the combination comprising: a sensing member movable in one path along with said instrument body and movable in a direction crossing the path of said pointer at the zero position of said pointer relative to said instrument body; and a member intercoupling said operating member and said sensing member for moving the latter toward the path of said pointer in response to actuation of said operating member, said intercoupling member being blocked by said sensing member, and thereby blocking said actuation, when said pointer is in its zero position relative to said instrument body.

2. The combination defined in claim 1, wherein said first element comprises a lens shutter and said second element comprises a lens diaphragm.

3. The combination defined in claim 1, wherein said sensing member is yieldably moved along with said instrument body, with a stop member fixed relative to said camera frame for limiting the movement of said sensing member relative to said frame.

4. The combination defined in claim 1, with: means delineating a viewing locus in said camera; and means normally visible at said locus and coupled to said intercoupling member for moving out of visibility at said locus in response to complete, unblocked actuation of said operating member.

5. The combination defined in claim 1, wherein movement of said instrument body is angular about an axis of said instrument, wherein said pointer is deflected about said axis, and wherein said sensing member comprises: a disk slidably mounted on said axis and a sensing arm integral with said disk and extending substantially parallel to said axis toward the path of said pointer, with spring means urging said disk and sensing arm axially away from the path of said pointer.

6. The combination defined in claim 5, wherein said spring means also urges said disk and sensing arm angularly in a direction opposite the deflected direction of said pointer, with: a first stop member fixed to said instrument body for limiting the angular movement of said sensing arm and disk relative to said body at substantially the zero position of said pointer; and a second stop member fixed to said camera frame for limiting the angular movement of said sensing arm and disk relative to said frame.

7. The combination defined in claim 5, with a second sensing member coupled to said disk for axial movement therewith and guided for such movement by said frame, said second sensing member being prevented by said frame from moving angularly with said disk and extending toward the path of said pointer for sensing the pointer, at a predetermined maximum pointer deflection relative to said frame, for blocking axial movement of said disk and thereby blocking actuation of said operating member.

8. The combination defined in claim 1, with a second sensing member coupled to said first sensing member and guided by said frame for movement with said first sensing member into and out of the path of said pointer at a predetermined position of maximum pointer deflection relative to said camera frame, said second sensing member being prevented by said frame from movement along with said instrument body, said second sensing member blocking movement of said first sensing member toward the path of said pointer, and thereby blocking actuation of said operating member, when said pointer is in said predetermined position of maximum deflection.

References Cited in the file of this patent
UNITED STATES PATENTS

| | | |
|---|---|---|
| 2,242,043 | Sanger | May 13, 1941 |
| 2,250,898 | Tonnies | July 29, 1941 |
| 2,340,622 | Simmon | Feb. 1, 1944 |
| 2,341,393 | Simmon | Feb. 8, 1944 |